United States Patent [19]

Margerum et al.

[11] Patent Number: 4,917,472
[45] Date of Patent: Apr. 17, 1990

[54] LIGHT VALVES WITH POSITIVE DIELECTRIC ANISOTROPY LIQUID CRYSTAL AND HIGHLY TILTED OFF-PERPENDICULAR SURFACE ALIGNMENT, AND ASSOCIATED OPERATING METHOD

[75] Inventors: John D. Margerum, Woodland Hills; Anna M. Lackner, Los Angeles, both of Calif.

[73] Assignee: Hughes Aircraft Company, Los Angeles, Calif.

[21] Appl. No.: 168,061

[22] Filed: Mar. 14, 1988

[51] Int. Cl.[4] .............................................. G02F 1/13
[52] U.S. Cl. .................................... 350/340; 350/338; 350/346; 350/347 E; 350/337
[58] Field of Search ............... 350/340, 341, 338, 346, 350/342, 347 E, 350 R, 337, 331 R

[56] References Cited

U.S. PATENT DOCUMENTS

| | | | |
|---|---|---|---|
| 3,834,792 | 9/1974 | Janning | 350/340 |
| 3,964,158 | 6/1976 | Janning | 350/341 X |
| 3,967,883 | 7/1976 | Meyerhoffer et al. | 350/340 |
| 4,022,934 | 5/1977 | Miller | 350/340 X |
| 4,030,992 | 6/1977 | Miller et al. | 350/340 X |
| 4,030,997 | 6/1977 | Miller et al. | 350/340 X |
| 4,114,991 | 9/1978 | Bleha, Jr. et al. | 350/341 X |
| 4,196,974 | 4/1980 | Hareng et al. | 350/346 |
| 4,201,453 | 5/1980 | Kobale et al. | 350/340 |
| 4,256,377 | 3/1981 | Krueger et al. | 350/340 |
| 4,464,134 | 8/1984 | Lackner et al. | 445/24 |
| 4,492,432 | 1/1985 | Kaufmann et al. | 350/338 |
| 4,521,080 | 6/1985 | Funada et al. | 350/341 |
| 4,589,735 | 5/1986 | Saunders | 350/338 |
| 4,735,492 | 4/1988 | Sekine et al. | 350/341 |
| 4,787,713 | 11/1988 | Lu et al. | 350/342 |

FOREIGN PATENT DOCUMENTS

| | | | |
|---|---|---|---|
| 2815481 | 10/1979 | Fed. Rep. of Germany | 350/340 |
| 3245002 | 6/1983 | Fed. Rep. of Germany | . |
| 0089929 | 4/1987 | Japan | 350/346 |

OTHER PUBLICATIONS

J. Fergason, "Performance of a Matrix Display Using Surface Mode", IEEE, 1980, pp. 177–179.

Grinberg et al., "Photoactivated Birefringent Liquid Crystal Light Valve for Color Symbology Display", IEEE Transactions on Electron Devices, vol. ED-22, pp. 775–783, Sep., 1975.

W. Urbach et al., "Alignment of Nematics and Smectics on Evaporated Films", Applied Physics Letters, vol. 25, No. 9, Nov. 1974, pp. 479–481.

K. Fahrenschon et al., "Properties of Pretilted Liquid Crystal Structures", J. of Electrochem Society, vol. 124, No. 6, Jun. 1977, pp. 953–955.

W. R. Heffner et al., "Liquid Crystal Alignment on Surfactant Treated Obliquely Evaporated Surfaces", Applied Physics Letters, 36 (2), Jan. 15, 1980, pp. 144–146.

L. Rousille et al., "Liquid Crystal Quasihomeotropic Orientation Induced by a Polymer Deposited on a SiO Surface", J. Appl. Phys. 50 (6), Jun. 1979, pp. 3975–3977.

(List continued on next page.)

Primary Examiner—Andrew J. James
Assistant Examiner—Huy Kim Mai
Attorney, Agent, or Firm—V. D. Duraiswamy; P. M. Coble; W. K. Denson-Low

[57] ABSTRACT

A liquid crystal cell useful in light valves is disclosed in which positive anisotropy liquid crystals are installed at an initial off-perpendicular alignment within the approximate range of 6°–45°. A light valve employing the cell is initially biased to a voltage approximately corresponding to a transmissivity peak; the selection of the exact bias voltage involves a trade-off between contrast and response speed. The cell surfaces are characterized by generally flat macrostructures and tilted surface microstructures, with an overcoat on the surfaces of a long chain alcohol with alkoxy groups derived therefrom bonded to the tilted surface microstructure. The alcohol molecules have the formula ROH, where R is a carbon chain having at least six carbon atoms therein.

11 Claims, 4 Drawing Sheets

OTHER PUBLICATIONS

Milo R. Johnson, et al., "Low-Tilt-Angle Nematic Alignment Compatible with Frit Sealing", IEEE Transactions on Electron Devices, vol. ED-24, No. 7, Jul. 1977, pp. 805–807.

F. Y. Yamagishi et al., "Photochemical and Thermal Stability Studies on a Liquid Crystal Mixture of Cyanobiphenyls", Liquid Crystals and Ordered Fluids, Pub. Plenum Press, NY, vol. 3, 1978, pp. 475–496.

J. D. Margerum et al., "Effects of Molecular Length on Nematic Mixtures . . . ", *Molecular Crystals and Liquid Crystals*, vol. 68, pp. 157–174, (1981).

L. J. Miller et al., "A New Method for Inducing Homeotropic and Tilted Silica Surfaces Alignments of Nematic Liquid Crystals", *Liquid Crystal and Ordered Fluids*, vol. 3, Plenum Pub. Corp., 1978, pp. 513–530.

M. J. Little et al., "A New Method for Inducing Homogeneous Alignment of Nematic Liquid Crystals", *Liquid Crystal and Ordered Fluids*, vol. 3, Plenum Publishing Corp., 1978, pp. 497–511.

D. Armitage, "Alignment oo Liquid Crystals on Obliquely Evaporated Silicon Oxide Films", J. Appl. Phys. 51 (5), 1980, pp. 2552–2555.

U. Efron et al., "The Applications of Silicon Liquid Crystal Light Valves to Optical Data Processing", Proceedings of SPIE—The Internat'l Society for Optical Engineering, vol. 388, Jan. 20–21, 1983, pp. 152–161.

U. Efron et al., "The Silicon Liquid-Crystal Light Valve", J. Appl. Phys. 57(4), Feb. 15, 1985, pp. 1356–1368.

A. M. Lackner et al., "Near Ultraviolet Photostability of Liquid Crystal Mixtures", Mol. Cryst. Liq. Cryst., 1986, vol. 141, pp. 289–310.

Wilson et al., "Alignment of LC on Surfaces with Films Deposited Obliquely at Low and High Rates", Mol. Cryst. Liq. Crystal, 1983, vol. 94, pp. 359–366.

E. P. Raynes et al., "Liquid Crystal Surface Alignment Treatment Giving Controlled Low Angle Tile", Molecular Crystal Liquid Crystal Letters, vol. 34, 1976, pp. 105–110.

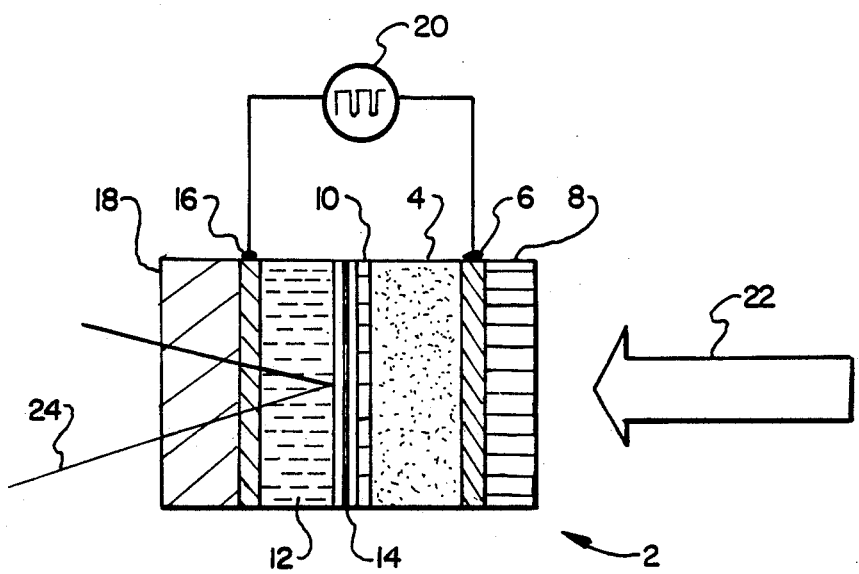
FIG.1. (PRIOR ART)
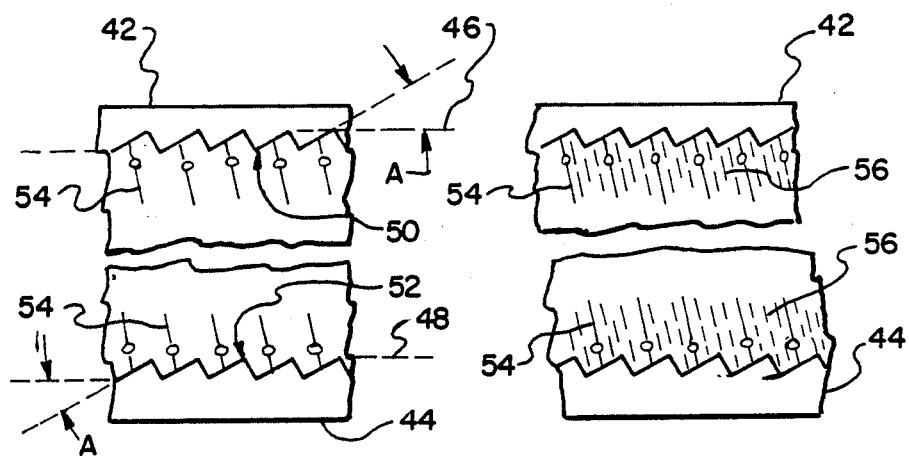
FIG.5.A.    FIG.5.B.

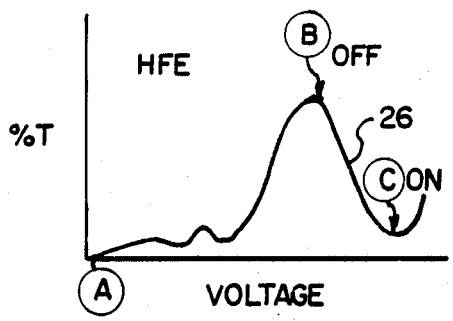
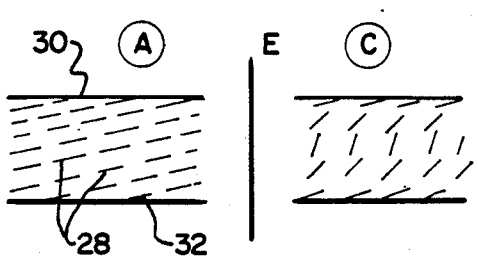
FIG.2.A.   FIG.2.B.   FIG.2.C.
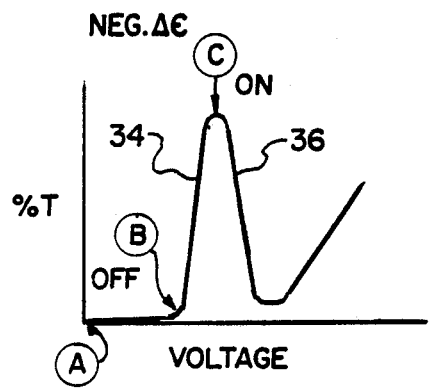
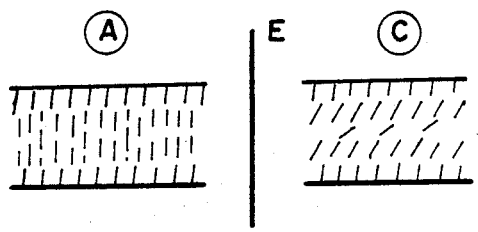
FIG.3.A.   FIG.3.B.   FIG.3.C.
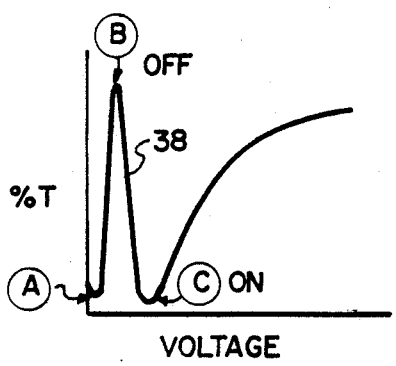
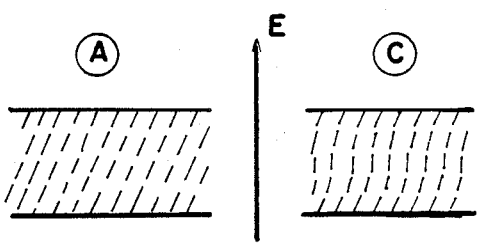
FIG.4.A.   FIG.4.B.   FIG.4.C.

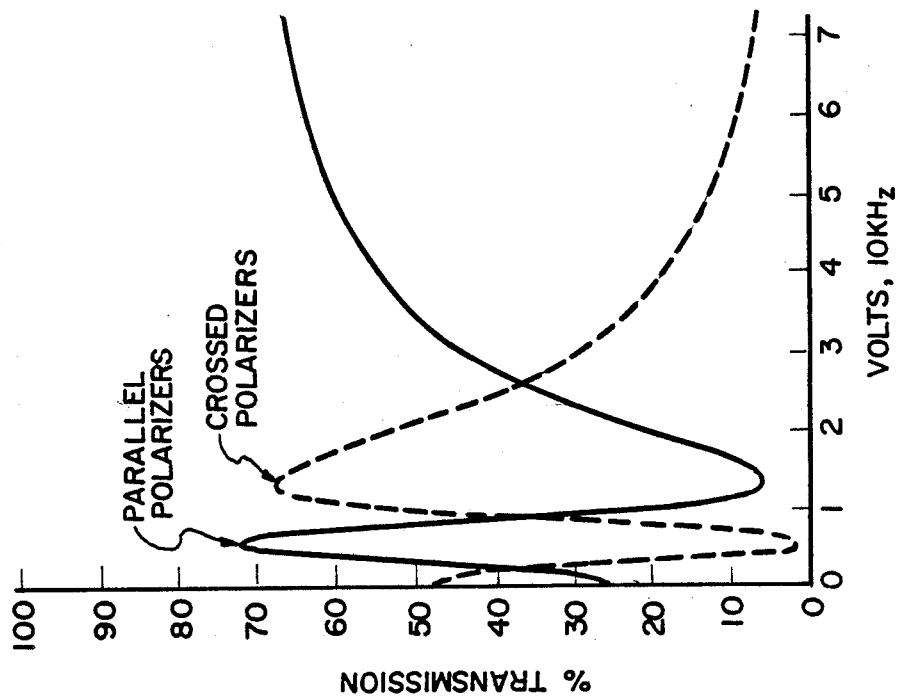
FIG.6.A.
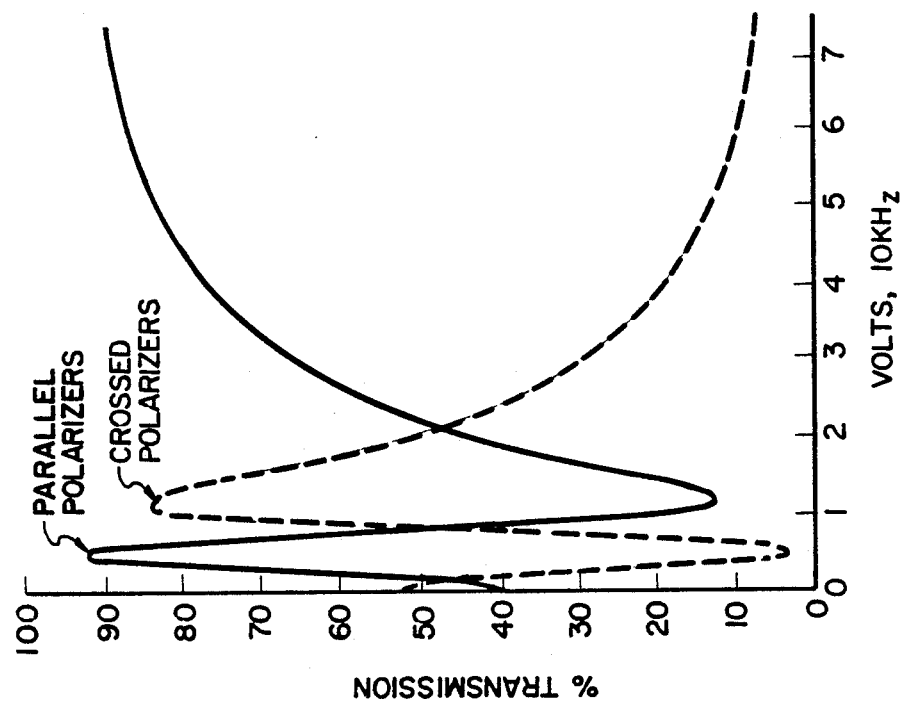
FIG.6.B.

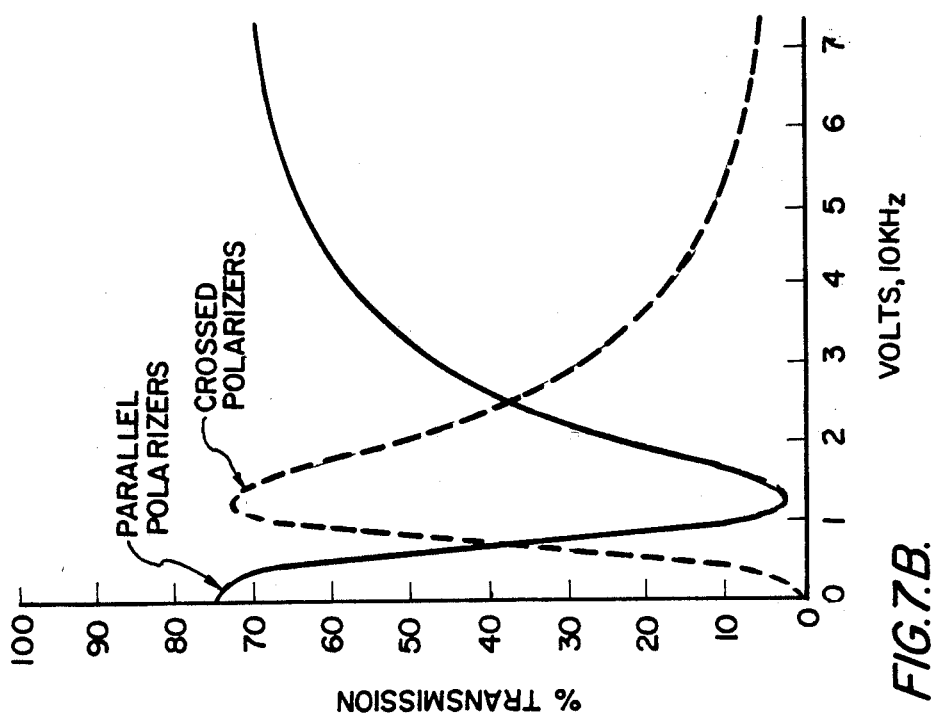
FIG.7.B.
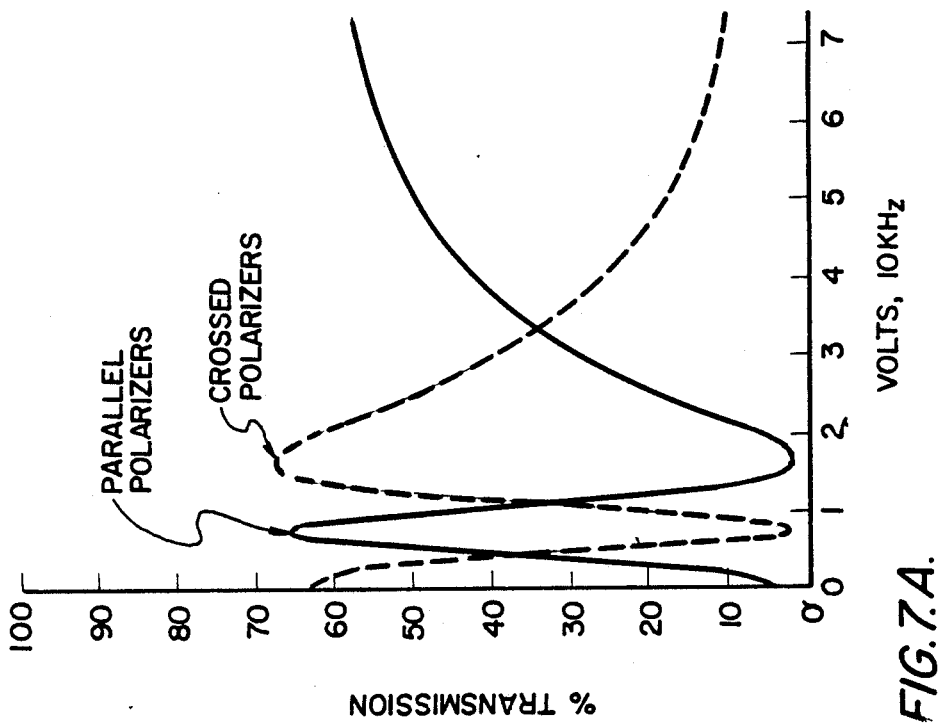
FIG.7.A.

LIGHT VALVES WITH POSITIVE DIELECTRIC ANISOTROPY LIQUID CRYSTAL AND HIGHLY TILTED OFF-PERPENDICULAR SURFACE ALIGNMENT, AND ASSOCIATED OPERATING METHOD

RELATED APPLICATION

This application is related to Ser. No. 919,155, filed Oct. 14, 1986 by Leroy J. Miller, Willis H. Smith, Jr., Anna M. Lackner and J. David Margerum for "Method and Apparatus for Tilted Alignment of Liquid Crystals With Improved Photostability", and assigned to Hughes Aircraft Company, the assignee of the present invention.

BACKGROUND OF THE INVENTION

1. Field of the Invention

This invention relates in general to the alignment of liquid crystals in electro-optical devices, and more particularly to a stable tilted alignment in liquid crystal light valves and displays for low voltage operation.

2. Description of the Related Art

Photoactivated liquid crystal light valves convert an input image to an electric field pattern across a liquid crystal cell, whereby the liquid crystal material within the cell is rotated in accordance with the local field. The liquid crystal orientation controls the transmission of an output beam from the light valve such that the output beam contains spatial information from the input beam, but often in a different format. One of the problems encountered with these devices is that, when the liquid crystals are initially aligned with their directors perpendicular to the cell walls in the absence of an applied field, the direction in which they tilt when a field is applied is somewhat random. Liquid crystals in different areas of the cell may tilt in different directions; this phenomenon can interfere with proper light valve operation, especially in the presence of lateral fields resulting from lateral gradients in the input light intensity.

In an attempt to overcome this problem, liquid crystal cells have been fabricated in which the directors of the liquid crystals are given a slight but uniform pretilt in the absence of an electric field. Thus, when a field is applied, the crystals will tilt in the same direction because of their uniform pre-tilt This technique has achieved good short term results in improving light valve operation, but thus far has suffered from a lack of adequate photostability. When exposed to light for significant periods of time, the tilted alignment deteriorates and the crystals return to a perpendicular alignment in the absence of a field. Thus, while a tilted alignment has been demonstrated to improve light valve operation, the short lifetime of devices which employ this technique has placed a practical limitation on their usefulness.

The desirability of maintaining a liquid crystal pretilt of about 2° to about 6° for a light valve is described in an article by Grinberg, et al., "Photoactivated Birefringent Liquid-Crystal Light Valve for Color Symbology Display", *IEEE Transactions on Electron Devices*, Vol. ED-22, page 775 (1975). This paper also cites the problem of liquid crystal deterioration from ultraviolet and visible light of high intensity.

A prior art technique for achieving a tilted liquid crystal alignment is described in U.S. Pat. No. 4,030,997 by Leroy J. Miller and Jan Grinberg, issued June 27, 1977 and assigned to Hughes Aircraft Company, the assignee of the present invention. This patent describes a technique in which the surface of a substrate is overcoated with a thin layer of $SiO_2$ or other material with reactive surface hydroxyl groups, and then ion beam etched at a shallow angle. The surface is next treated with a mixture of a long chain aliphatic alcohol having the formula $CH_3(CH_2)_nCH_2OH$, where n ranges from about 2 to about 18, and an aliphatic amine catalyst The treatment takes place by immersing the substrate in a hot liquid mixture of the alcohol and amine, followed by washing the surface with an inert organic solvent. In this approach the alcohol reacts to convert $SiO_2$ surface hydroxyl groups into alkoxy groups. The liquid crystal tilt angle has been found to be dependent upon the ion beam etching conditions, the length of the alkoxy group bonded to the surface, the liquid crystal mixture used in the cell, and the temperature. Typical photostability lifetimes of cells formed by this method were only about two to four $Wh/cm^2$ of exposure from a xenon arc lamp filtered to give a broad band exposure (385–950 nm) with an intensity of about 150 $mW/cm^2$ on the light valve cell. These cells failed rapidly because the off-perpendicular liquid crystal tilt was rapidly and excessively reduced, e.g., a cell change from an initial tilt of 3° down to 0.4° after only three $Wh/cm^2$ of exposure. The initial tilt angle of the cells also varied substantially with the cell temperature.

Several reports have been made on other techniques for obtaining tilted-perpendicular liquid crystal surface alignment, but none of them disclosed any significant improvement in the photostability of the pre-tilt alignment. An article by W. Urbach et al. in *Applied Physics Letters*, Volume 25, page 479 (1974) describes the use of the surfactant CTAB (cetyltrimethylammonium bromide) on angle-evaporated coatings of SiO to obtain perpendicular or tilted-perpendicular alignment. A CTAB coating is achieved by slowly pulling the plates vertically from the surfactant solution. The CTAB coating on a shallow angled SiO deposition, deposited at a grazing angle of about 15°, gave large off-perpendicular liquid crystal alignment. Small off-perpendicular alignments were achieved for a medium angle SiO deposition deposited at a grazing angle of about 25°, while a perpendicular alignment resulted from SiO deposited at a large grazing angle of about 50°. Because the CTAB is not chemically bonded to the surface, some or even all of it can dissolve in the liquid crystal, depending upon the liquid crystal structure, thickness and temperature. The dissolved CTAB will increase the conductivity of the liquid crystal, which is undesirable for a field-effect device such as tuneable birefringence. Neither the surface nor the dissolved CTAB would be expected to have long term photostability at high radiation intensities.

The use of lecithin or "acid T" as a surfactant dopant for bulk liquid crystals in cells with medium angle deposited SiO (15°–30° off-surface deposition), or with medium angle deposited $MgF_2$ treated surfaces, is described in K. Fahrenschon and M. F. Schiekel, *Journal of the Electrochemistry Society*, Vol. 124, page 953 (1977). The article gives examples of 12° and 16° pretilts for the liquid crystals in the tilted-perpendicular cells. The surfactants used are not chemically bonded to the surface, and have not been found to be either thermally or photochemically stable alignment agents, especially for long period, high intensity exposures.

W. R. Heffner, et al., *Applied Physics Letters*, Vol. 36, page 144 (1980) described the use of silane (DMOAP) and of ultrathin plasma polymerized tetrafluoroethylene (UTPFE) on obliquely deposited silicon monoxide shallow angle deposition-$SiO_x$ surfaces, with a 5° grazing angle, to obtain tilted-perpendicular liquid crystal alignment. Off-normal liquid crystal angles of 16°–20° were reported with the silane/SiO treatment and the liquid crystal CB-7, 20°–35° with an azoxy liquid crystal, and 22°–32° with the UTPFE/SiO treatment and CB-7. Each of these "surfactant" reagents are reported to give well adhered polymer coatings on glass (or SiO) surfaces, and these could be considerably more stable than the CTAB and lecithin surfactants reported above. However, no devices were described and no photostability data were reported.

An article by L. Rousille and J. Robert in *Journal of Applied Physics*, Vol. 50, page 3975 (1979) describes the use of plasma polymerized polytetrafluoroethylene (PTFE) films 20 angstroms thick on medium angle deposited-SiO (30° grazing angle deposition) surfaces. Liquid crystals with about a 3° off-perpendicular tilt were obtained. Thicker PTFE films of 50 angstroms resulted in 0° tilt on the shallow angle deposited-SiO. No photostability or thermal stability lifetime data were reported or discussed.

Techniques for obtaining surface-perpendicular (non-tilted) liquid crystal alignment by forming surface alkoxy groups bonded to the surface by the reaction of long chain alcohols with surface hydroxyl groups are described in U.S. Pat. No. 4,022,934 by Leroy J. Miller, issued May 10, 1977 and U.S. Pat. No. 4,464,134 by Anna M. Lackner et al., issued Aug. 7, 1984, both assigned to Hughes Aircraft Company. The Miller patent describes the reaction of the surface with long chain alcohols by immersing the surface in a hot bath of the alcohol or an alcohol/amine mixture. The Lackner et al. patent describes an improved technique of reacting the surfaces with long chain alcohols by exposure to hot alcohol vapor. The two patents deal with the achievement of a perpendicular alignment, rather than a tilted alignment. The Lackner et al. patent deals with methods for obtaining substantially perpendicular liquid crystal surface alignment on surfaces which include an oxide coating selected from the group consisting of $SiO_2$, SiO, indium-tin-oxide/$SiO_2$, tin-oxide/$SiO_2$ and indium/$SiO_2$ mixtures.

Another technique that is relevant to the present invention is reported in an article by Milo Johnson and P. Andrew Penz, "Low Tilt Angle Nematic Alignment Compatible With FRIT Sealing", *IEEE Transactions on Electron Devices*, Vol. ED-24, No. 7, July 1977, pages 805–807. The reported technique is used for tilted surface-parallel liquid crystal alignment. In this technique a combination of medium angle deposition (MAD) and shallow angle deposition (SAD) of $SiO_x$ on a surface with a basically planar macrostructure is used to achieve a tilted surface microstructure having a generally saw-tooth-shaped profile. This technique is used for low tilt homogenous liquid crystal alignment.

Despite the considerable amount of work that has been done in both the treatment of surfaces to obtain tilted microstructures, and in methods for obtaining both tilted and perpendicular liquid crystal orientations, a liquid crystal cell capable of retaining a tilted-perpendicular liquid crystal orientation over extended operating periods in a light valve was not achieved until the subject matter of related Patent Application Ser. No. 919,155 filed Oct. 14, 1986, was developed.

In the related patent application, one or both opposed surfaces of a liquid crystal cell are treated so as to provide the surfaces with generally aligned microstructures having tilt angles relative to the surface macrostructures which may be inferred to fall within the range of about 0.5° to about 6°. The surfaces are provided with free hydroxyl groups. The desired microstructure configuration is achieved by MAD (medium angle deposition) and SAD (shallow angle deposition) depositions of $SiO_x$, where x is from one to two, with the two depositions oriented approximately 90° to each other. A long chain alcohol is then reacted with the surface and alkoxy groups are chemically bonded to the tilted surface microstructures, the alcohol molecules having the formula ROH, where R is a carbon chain having from about 6 to about 24 carbon atoms. The alcohol may be mixed with an amine, and is preferably bonded to the tilted surface microstructure by exposing the surface to the alcohol vapor. The substrate itself is preferably formed from $SiO_x$. Negative dielectric anisotropy liquid crystals introduced into the prepared cell are aligned by the alkoxy groups to achieve the desired zero-field tilt.

While cells formed in this manner have been found to exhibit a much higher degree of tilt photostability than in previous techniques, both their temperature range and speed of response have been found to be somewhat limited by the availability of suitable liquid crystals of negative dielectric anisotropy. Also, a faint honeycomb pattern known as the "chicken wire effect" has been noticed in the output of some photoactivated liquid crystal light valves. This is believed to arise from the practice of driving the light valve with light from a cathode ray tube through a fiber optic face plate, in which the optical fibers are not perfect and produce the undesired chicken wire effect. The liquid crystals are selected from negative dielectric anisotropy materials, meaning that they rotate away from the field established across the cell in response to an applied input image.

SUMMARY OF THE INVENTION

In view of the above problems, the present invention seeks to retain the improved photostability of the related application, and at the same time to provide a lower operating voltage, a wider choice of liquid crystal materials, and to minimize the chicken wire effect in light valves photoactivated through a fiber optic face plate.

These advantages are achieved by providing a liquid crystal cell in which a positive dielectric anisotropy liquid crystal medium is enclosed at an off-perpendicular tilt angle in the range of about 6°–45°. The pre-tilt is established in a manner similar to the related application, but a greater shallow angle deposition is used to produce a significantly greater tilt angle on one or both surfaces.

In a tuneable birefringent mode of operation with the cell rotated 45° with respect to polarizers (either crossed or parallel), the liquid crystal exhibits a peak transmissivity at a predetermined bias voltage across the cell, with progressively lower transmissivities at greater and lesser bias voltages. When incorporated into a light valve, the cell is biased to the region of its peak transmissivity so as to provide high contrast with a small change in the signal voltage. Alternately, the cell can be operated from a bias-controlled transmission minimum to a high transmission on-state. These operational modes are applicable to liquid crystal active matrix devices as well as light valves.

These and other features and advantages of the invention will be apparent to those skilled in the art from the following detailed description of preferred embodiments, taken together with the accompanying drawings, in which:

DESCRIPTION OF THE DRAWINGS

FIG. 1 is a simplified sectional view of a liquid crystal light valve system;

FIGS. 2(a), 2(b), and 2(c) are a transmissivity-voltage curve, and illustrations of the initial liquid crystal alignment and fully ON liquid crystal alignment, respectively, for a prior hybrid field effect liquid crystal light valve;

FIGS. 3(a), 3(b) and 3(c) are a transmissivity-voltage curve, and illustrations of the initial liquid crystal alignment and fully ON liquid crystal alignment, respectively, for the related patent application identified above;

FIGS. 4(a), 4(b), and 4(c) are a transmissivity-voltage curve, and illustrations of the initial liquid crystal alignment and fully ON liquid crystal alignment, respectively, with the present invention; and FIGS. 5(a) and 5(b) are illustrative fragmentary drawings of a portion of a liquid crystal cell formed in accordance with the invention, with FIG. 5(a) illustrating the microstructure of the interior cell surface and the orientation of alkoxy groups bonded thereto and FIG. 5(b) illustrating the orientation of later added liquid crystals.

FIGS. 6(a) and 6(b) are examples of transmissivity-voltage curves for the liquid crystal BDH-E7 with two different sets of cell tilt angles and thicknesses, showing operation between both crossed and parallel polarizers in a reflective cell.

FIGS. 7(a) and 7(b) are examples of transmissivity-voltage curves for the liquid crystal ZLI-1132 with two different sets of cell tilt angles and thicknesses, showing operation between both crossed and parallel polarizers in a reflective cell.

DETAILED DESCRIPTION OF PREFERRED EMBODIMENTS

A typical liquid crystal light valve 2 of the MOS variety is illustrated in FIG. 1. This and similar devices are described, for example, in articles by U. Efron, et al., "The Silicon Liquid-Crystal Light Valve," Journal of Applied Physics, Vol. 57, No. 4, Feb. 15, 1985, pp. 1356–1368, and U. Efron, et al., "The Applications of Silicon Liquid Crystal Light Valves to Optical Data Processing", Proceedings of SPIE-The International Society of Optical Engineering, Jan. 20-21, 1983, pp. 152-161.

The light valves consist of a silicon photoconductor substrate 4 with a back contact electrode 6 and fiber optic plate 8 on its input side, and a $SiO_2$ layer 10 on its readout side. The photoconductor is separated from a liquid crystal cell 12 by a dielectric mirror 14 or similar device. A counter electrode 16 followed by a glass cap 18 are provided on the readout side of the device. An AC voltage source 20 connected across the back contact 6 and dielectric electrode 16 establishes a bias to set an operating point for the liquid crystal. In operation, an input image 22 is applied to the input side of the device, while a linearly polarized readout beam 24 is transmitted through the liquid crystal cell and reflected back from dielectric mirror 14 through a crossed polarizer (not shown). The input image produces a corresponding spatial voltage distribution across the liquid crystal cell, altering the localized alignment of the liquid crystals in accordance with the voltage pattern. This results in a spatial modulation of the readout beam 24, permitting a transfer of information from the input to the readout beams. The liquid crystal cell of the present invention is usable not only in place of the liquid crystal layer 12 of the MOS-LCLV configuration shown in FIG. 1 as an example, but also with other types of light valves, including CdS- and CCD- light valves. It is also usable in liquid crystal active matrix devices.

The liquid crystal alignment and operating characteristics of the present invention will now be contrasted with two prior approaches. The first prior approach, illustrated in FIGS. 2(a), (b) and (c), involves a hybrid field effect liquid crystal light valve. This type of device uses a positive dielectric anisotropy liquid crystal in a 45° twisted-nematic configuration as the light modulator. The transmissivity T of the liquid crystal at any localized area of the cell is plotted against the voltage across that area in FIG. 2(a). Beginning initially at A with zero voltage, the curve exhibits lower level preliminary peak transmissivities before reaching a high peak transmissivity at B. In normal operation the light valve is often biased to point B, which would represent the OFF situation with no applied input radiation. The curve then falls along a "back slope" 26 to a minimum C, which is equated with a fully ON input.

The status of the liquid crystals within the liquid crystal cell for points A and C is illustrated in FIGS. 2(b) and 2(c), respectively. A positive dielectric anisotropy liquid crystal is employed, meaning the liquid crystals 28 tend to align in the direction of an applied electric field E. The liquid crystals are initially aligned at about 1°-2°. off-parallel to the cell walls 30, 32, or in other words about 88°-89° off-perpendicular to the cell walls. When field E is applied, the liquid crystals rotate toward the field by an amount determined by the field strength. At operating point C the liquid crystals have rotated substantially toward a perpendicular orientation with respect to the cell walls, as shown in FIG. 2(c); at the maximum transmissivity point B the crystal orientation is between those shown in FIGS. 2(b) and 2(c).

While this device exhibits a fast response to changing voltage levels and liquid crystals can be chosen which have a fairly long photostability lifetime as described by A. M. Lackner et al., Mol. Cryst. Liq. Cryst., 141, 289–310 (1986), it suffers from a relatively low contrast and does not achieve optimum photostability because small quantities of photo products cause local surface-perpendicular areas of alignment of the liquid crystal.

The approach taken in the related patent application identified above is illustrated in FIGS. 3(a)–(c). This approach employs a negative dielectric anisotropy liquid crystal which rotates away from an applied electric field, rather than towards the field. Its transmissivity characteristic as a tuneable birefringent cell between crossed polarizers is illustrated in FIG. 3(a). At an initial unbiased point A it is essentially non-transmissive, and remains this way until point B, where the transmissivity begins to rise. The device is normally biased to point B, so that further increases in voltage due to an input image will produce positive increases in transmissivity. A peak transmissivity is reached at point C at which the device is considered to be fully ON.

The liquid crystal orientation at points A and C is illustrated in FIGS. 3(b) and 3(c), respectively; the orientation at point B would exhibit an intermediate liquid crystal alignment. At point A the liquid crystals are off-perpendicular to the cell walls by a small angle, in the range of about 0.5°–6°. This small pre-tilt angle is used so that a very dark off-state is obtained. The amount of tilt utilized is generally that required to maintain the tilt direction during operation of the liquid crystal light valve. This is for operation as a tuneable birefringent mode where the cell is generally used between crossed polarizers, with the incident plane of polarization at a 45° angle to the surface direction of the liquid crystal pre-tilt. The liquid crystal tilt is increased as the voltage increases, until it is at an appreciable off-perpendicular angle at point C.

This related approach achieves a high contrast, and also has a very high degree of photostability because the tilted surface-perpendicular alignment at the surface is relatively insensitive to the liquid crystal photodegradation products. However, liquid crystals with highly negative dielectric anisotropy, as well as wide temperature range, high photostability and a fast television range response rate are not readily available, and the device is relatively slow to return to its pre-tilt state when the field is turned off. Also, operation takes place on the front slope 34 of the transmissivity-voltage curve, rather than the back slope 36, because the voltages along the back slope are too high. This means that the transmissivity increases as the voltage increases, rather than decreasing with increasing voltage as in the hybrid field effect device. The result is that the peak light intensity coincides with the peak voltage, giving rise to the "chicken wire" effect discussed above for photoactivated light valves.

An operating scheme of the present invention is illustrated in FIGS. 4(a)–(c). It employs a positive dielectric anisotropy liquid crystal, with a pre-tilt angle which is made large enough to preferably go just past a tuneable birefringent transmission minimum (using parallel polarizers) in the off-state. In its unbiased state the liquid crystals are tilted at a substantial angle to perpendicular, in the range of about 6°–45°, as illustrated in FIG. 4(b). Operation takes place along the back slope 38 of the transmissivity-voltage curve, with the peak transmissivity B corresponding to a biased OFF-state and a very low transmissivity at C corresponding to the ON-state. As illustrated in FIG. 4(c), the liquid crystals reach a slightly tilted perpendicular alignment at point C. This approach provides low voltage operation, is consistent with a high degree of photostability, good contrast, with a wide selection of positive dielectric anisotropy liquid crystals, and with photoactivated switching from high transmissivity to a dark on-state at point C. Cells formed with the new liquid crystal structure can also be operated as tuneable birefringent cells between crossed polarizers, in nearly the reverse mode to the related cells described by FIG. 3(a). In both types of operation the cells are generally used between polarizers, with the incident plane of polarization at a 45° angle to the direction of the liquid crystal pre-tilt.

The general approach to establishing the positive anisotropy liquid crystals with an initial off-perpendicular tilt angle of about 6°–45° is illustrated in FIG. 5(a). Members 42 and 44 are opposed walls in a liquid crystal cell, which is shown empty of liquid crystals. The walls generally have a coating of angle deposited silicon oxide layers, e.g., $SiO_x$, where x is from 1 to 2. The interior surfaces of the opposed walls generally lie in parallel planes indicated by dashed lines 46 and 48, with a generally smooth macrostructure. The two surfaces are treated, however, to produce tilted surface microstructures having generally saw-toothed profiles 50, 52. The precise surface topography of the microstructure has not been measured. However, because the liquid crystal later added to the cell can have a tilt angle within the range of about 6° to about 45°, it can be inferred that the surface of the microstructure is tilted from the macrostructure plane by an angle A which lies in a similar range of about 6° to about 45°.

Long chain alcohol molecules are reacted with each surface, and long chain alkoxy groups are chemically bonded to each surface. Although there is uncertainty as to the exact surface structure, the bonding can be illustrated as in FIG. 5(a) with the alkoxy groups 54 oriented perpendicular to the tilted microstructure.

The situation after a thin layer of liquid crystals, typically about 4–20 microns thick, has been added to the cell is illustrated in FIG. 5(b). The liquid crystals 56 conform to the orientation of the long chains, aligning perpendicular to the microstructure and thus at a uniform tilt angle to the macrostructure surface Whereas the photodegradation of liquid crystals in the presence of other surfaces has been observed to cause a more perpendicular alignment, apparently as a result of the interaction between the degradation products and the surface, the arrangement of FIG. 5(b) has surprisingly been found to produce an unusually high photostability of the tilted perpendicular liquid crystal alignment. Although the explanation for this phenomenon is still under study, it is believed to result not from the outright prevention of liquid crystal photoproducts due to decomposition during light exposure, but rather from such photoproducts becoming attached to the microstructure surface with the same directionality as the alkoxy chains. Accordingly, they do not significantly alter the tilted alignment relative to the macrosurface.

The saw-toothed microstructure profile is preferably obtained by a one-step or two-step process similar to that employed in the related application. In the two-step, a layer of MAD (medium angle deposition)-$SiO_x$ is first deposited on the substrate (x is from 1 to 2), preferably by thermal evaporation in a vacuum system, at about a 20°–40° grazing angle, (preferably a MAD grazing angle of about 30°). An undercoating of sputtered $SiO_2$ or $Si_3N_4$ may be provided. The substrate is then rotated 90°, and a second layer of SAD (shallow angle deposition)-$SiO_x$ is deposited, at a grazing angle of about 2°–10°, (preferably a SAD grazing angle of about 5°), on top of the first layer, thus orienting the two depositions at approximately 90° to each other. Alternately, the first deposition can be a SAD of SiO or $SiO_2$, followed by a MAD of SiO or $SiO_2$, with an appropriate adjustment in the thicknesses of the two layers. In FIG. 5(a), with the MAD preceding the SAD, the SAD would be applied from the left for upper substrate 42, and from the right for lower substrate 44. In the one-step process, just SAD-$SiO_x$ is used.

Other techniques may be available to obtain the desired tilted surface microstructure. For example, although it has not been demonstrated in this context, it may be possible to form a suitable holographic blazed grating on the cell wall surface to achieve the desired saw-toothed topography. Whatever method is used to obtain the microstructure, free hydroxyl (OH) groups should be present at the microstructure surface to bond with the long alkoxy chains.

In FIGS. 5(a) and 5(b) the microstructures for the upper and lower substrates are generally parallel. In certain cases it may also be possible to have the two microstructures with different degrees of tilt, or by forming the tilted microstructure for only one of the substrates. Under appropriate conditions this may be enough to tilt the liquid crystal throughout the cell.

After the desired microstructure surface topography has been achieved, a long chain alcohol is brought into contact with the surface and chemically bonded to the free hydroxyl groups. The alcohol molecules have the formula ROH, where R is a carbon chain having from about 6 to about 24 carbon atoms therein. The molecules may be either pure aliphatic chains, or may include aromatic rings within the chain. It is possible that modified carbon chains, such as branched chains or chains with additional substances such as oxygen, nitrogen or fluorine, might also work, but this is not known at present. Although in theory there is no upper limit to the length of the chains, chains with more than 24 carbon atoms are quite expensive. For some liquid crystals (e.g., certain Schiff base mixtures), the number of carbon atoms can be as small as 6, or possibly even less for marginally acceptable alignment. For others, the number of carbon atoms must be 14–18 or more.

The substrates are preferably exposed to the long chain alcohol in a heated vapor phase, as in U.S. Pat. No. 4,464,134, or they can be dipped into a molten alcohol and then washed as in U.S. Pat. Nos. 4,022,934 and 4,030,997. With the vapor process, the vapor pressure will decrease at a given temperature as the number of carbon atoms in the chain increases, and the rate of reaction with the substrate surface will decrease as the vapor pressure decreases. Octadecanol, with 18 carbon atoms, is satisfactory in most cases and is considered to be the alcohol of choice.

The choice of the thicknesses of MAD and SAD-$SiO_x$ layers depends upon the desired liquid crystal tilt angle and the particular liquid crystal being aligned. The resultant tilt appears to result from the topographical effect of the long chain alcohol on the treated surface, and does not depend greatly upon the chain length of the longer chain alcohols.

This preparation differs from that employed with the related patent application principally by the use of more SAD to produce a greater off-perpendicular tilt angle. The following examples of surface preparation, cell fabrication, and electro-optical performance are illustrative of this invention.

EXAMPLE #1 (FIG. 6a)

The liquid crystal BDH-E7 was used a 12.7 um thick perimeter spacer cell in which the transparent indium tin oxide (ITO) electrode surfaces had SAD-$SiO_2$ depositions of 78 Å and 350 Å, respectively, before each was treated with $C_{18}H_{37}OH$ vapor for 2 hours at 140° C. The cell was operated in a tuneable birefringent reflection mode (rotated 45° with respect to the incident polarization), using both parallel and crossed polarizers with green light (broad band peaked at 545 nm). This cell is best operated between a bias voltage of 0.5 V and a maximum voltage of 1.2 V, corresponding to a maximum signal voltage of only 0.7 V. It can be operated with either a bright or dark bias off-state, although this particular cell showed the best contrast ratio between crossed polarizers.

EXAMPLE #2 (FIG. 6b)

The liquid crystal BDH-E7 was used a 3.5 um thick perimeter spacer cell in which one ITO electrode surface had sequential depositions of 76 Å of MAD-$SiO_2$ and 2 Å of SAD-$SiO_2$ before being treated with $C_{18}H_{37}OH$ vapor for 2 hours at 140° C. The other ITO electrode had a deposition of 350 Å of SAD-$SiO_2$ only. The cell was operated in a tuneable birefringent reflection mode (rotated 45° with respect to the incident polarization), using both parallel and crossed polarizers with green light (broad band peaked at 545 nm). Its electro-optical characteristics are similar to the cell shown in Example #1, showing that these two different combinations of surface treatment and cell thicknesses result in the same type of tuneable birefringent performance.

EXAMPLE #3 (FIG. 7a)

The liquid crystal ZLI-1132 was used a 12.7 um thick perimeter spacer cell in which one ITO electrode surface had sequential depositions of 76 Å of MAD-$SiO_2$ and 2 Å of SAD-$SiO_2$ before being treated with $C_{18}H_{37}OH$ vapor for 2 hours at 140° C. The other ITO electrode had a deposition of 350 Å of SAD-$SiO_2$ only. The cell was operated in a tuneable birefringent reflection mode (rotated 45° with respect to the incident polarization), using both parallel and crossed polarizers with green light (broad band peaked at 545 nm). This cell showed good "back slope" operation between a bright off-state with a 0.8 V bias and a total overall voltage of 1.6 V for a dark state minimum, corresponding to an operating maximum signal of only 0.8 V and a 2:1 switching ratio between bias and maximum voltage. These conditions, the contrast ratio, and the photostability of ZLI-1132 (enhanced by use of the alcohol treated electrode) are all very favorable for use with photoactivated light valve projectors in which the "chicken wire" effect of a fiber optic CRT writing source would also be minimized.

EXAMPLE #4 (FIG. 7b)

The liquid crystal ZLI-1132 was used a 6.1 um thick perimeter spacer cell in which one ITO electrode surface had sequential depositions of 76 Å of MAD-$SiO_2$ and 2 Å of SAD-$SiO_2$ before being treated with $C_{18}H_{37}OH$ vapor for 2 hours at 140° C. The other ITO electrode had a deposition of 350 Å of SAD-$SiO_2$ only. The cell was operated in a tuneable birefringent reflection mode (rotated 45° with respect to the incident polarization), using both parallel and crossed polarizers with green light (broad band peaked at 545 nm). This cell showed excellent performance (bright or dark off-state) between a 0.2 V bias and a 1.2 V maximum, corresponding to a 1.0 V maximum operating signal. This type of liquid crystal and cell is very favorable for use in an active matrix activated light valve projection system operated at low voltage and with long term photostability.

The optimum tilt angle required to obtain the no-voltage and bias voltage conditions described in relation to FIGS. 4(a), 5(a) and (b) and 6(a) and (b) depends upon the birefringence of the particular liquid crystal used, the liquid crystal thickness in the cell, the use of a transmission or reflective mode, and the mode of operation chosen.

The high off-state tilt angle with liquid crystals of positive dielectric anisotropy are particularly useful when one or more of the following features are desired:

1. Low voltage operation of cells for either photoactivated light valves or for active matrix projection displays.

2. A bright biased off-state, similar to that used in the back slope operational mode in hybrid field effect light valves.

3. High dielectric anisotropy liquid crystals (used for low voltage response), which are most readily available in positive dielectric anisotropy liquid crystals.

4. High photostability combination of liquid crystals and surface tilt as compared to hybrid field effect cells or to tuneable birefringent cells with slightly tilted surface-parallel liquid crystal alignment.

5. High birefringent liquid crystals (used in thin cells for fast time response), which are more commonly available in positive dielectric anisotropy liquid crystals.

The invention is very useful, for example, to obtain longer liquid crystal light valve lifetimes than hybrid field effect devices at lower voltages when using high birefringent liquid crystals of highly positive dielectric anisotropy such as BDH-E7, or for obtaining higher light throughput and longer lifetimes when using liquid crystals of lower birefringence such as Merck Company ZLI-1132. It is particularly useful in providing photostability in liquid crystal light valve cells used for projection displays. It is also very useful for the operation of low voltage active matrix projection displays, such as the reflective cell of highly tilted ZLI-1132 shown in FIG. 7b which can be operated to a fully on-state with only a 1 V rms signal with either a bright off-state (parallel polarizers) or a dark off-state (crossed polarizers). For full color light valves or active matrix projection systems the optimum contrast will be obtained with a cell optimized for each color channel (e.g., red, blue and green) since the position of the minima, maxima, and zero-voltage transmission varies with the wavelength as well as the cell thickness.

While particular embodiments of the invention have been shown and described, numerous variations and alternate embodiments will occur to those skilled in the art. Accordingly, it is intended that the invention be limited only in terms of the appended claims.

We claim:

1. A liquid crystal light valve system, comprising:
a liquid crystal light valve including a liquid crystal cell operable in a tuneable birefringent mode having a pair of walls with opposed inner surfaces, and means for establishing a spatial voltage pattern across said cell in response to the spatial pattern of an input radiation beam, said cell containing a positive dielectric anisotropy liquid crystal medium at a tilt angle off-perpendicular to said opposed cell surfaces within the approximate range of 6°–45°, said liquid crystal being characterized by a peak transmissivity at a corresponding first bias voltage, and by a progressively decreasing transmissivity at bias voltages greater and lesser than said first bias voltage, and
means for applying a bias voltage across said cell which is approximately equal to said first bias voltage which corresponds to said peak transmissivity, and
first and second polarizers, said liquid crystal light valve being positioned between said polarizers.

2. The liquid crystal light valve system of claim 1, wherein said bias voltage applying means applies a bias voltage across said cell which is less than said first bias voltage by an approximate tolerance factor sufficient to ensure that the peak transmissivity is within the light valve's operating range, thereby providing for high contrast.

3. The liquid crystal light valve system of claim 1, wherein said bias voltage applying means applies a bias voltage across said cell which is greater than said first bias voltage by an approximate tolerance factor sufficient to ensure that the cell returns to the predetermined bias voltage in the absence of input radiation, thereby providing for a fast liquid crystal response.

4. The liquid crystal cell of claim 1 said wall surfaces being characterized by generally planar macrostructures and tilted surface microstructures, with an overcoat on the surfaces comprising a long chain alcohol with alkoxy groups derived therefrom being bonded to the tilted surface microstructure, the alcohol molecules having the formula ROH, where R is a carbon chain having at least about 6 carbon atoms therein.

5. The liquid crystal cell of claim 4, wherein the cell wall surfaces are formed from $SiO_x$, where x is from 1 to 2.

6. The liquid crystal cell of claim 4, wherein the carbon chains have from about 6 to about 24 carbon atoms therein.

7. The liquid crystal cell of claim 4, wherein the tilted surface microstructure has a generally sawtooth profile.

8. A method of operating a liquid crystal light valve to modulate a readout beam in accordance with an input signal, said light valve including a liquid crystal cell having a pair of walls with opposed inner surfaces, said cell containing a positive dielectric anisotropy liquid crystal medium at a tilt angle off-perpendicular to said opposed cell surfaces within the approximate range of 6°–45°, said liquid crystal being characterized by a peak transmissivity at a corresponding first bias voltage, and by a progressively decreasing transmissivity at bias voltages greater and lesser than said first bias voltage, comprising:
applying a bias voltage across said cell which is approximately equal to the voltage level corresponding to said peak transmissivity,
applying an input signal to the light valve,
superimposing a signal voltage corresponding to said input signal upon the second bias voltage across said cell to control the liquid crystal tilt angle,
directing a readout beam through said cell, and
modulating said readout beam in accordance with the signal voltage and liquid crystal tilt angle.

9. The method of claim 8, wherein the bias voltage applied across the cell is less than said first bias voltage by an approximate tolerance factor sufficient to ensure that the peak transmissivity is within the light valve's operating range, thereby providing for high contrast.

10. The method of claim 8, wherein the bias voltage applied across the cell is greater than said first bias voltage by an approximate tolerance factor sufficient to ensure that the cell returns to the first bias voltage in the absence of an input signal to the light valve, thereby providing for a fast liquid crystal response.

11. A liquid crystal tuneable birefringent system comprising:
a liquid crystal cell operable in a tuneable birefringent mode, said cell having a pair of opposed inner surfaces, said cell containing a positive dielectric anisotropy liquid crystal medium at a tilt angle off-perpendicular to said opposed cell surfaces within the approximate range of 6°–45°, said liquid crystal being characterized by a minimum transmissivity at a corresponding first bias voltage, and by a progressively increasing transmissivity at bias voltages greater and lesser than said first bias voltage;

means for applying a bias voltage across said cell approximately equal to said first bias voltage, and first and second polarizers, said cell being positioned between said polarizers.

* * * * *